Sept. 2, 1958 J. F. O'DONNELL ET AL 2,849,850
TRACTOR MOUNTED HARVESTER
Filed Dec. 28, 1953 4 Sheets-Sheet 3
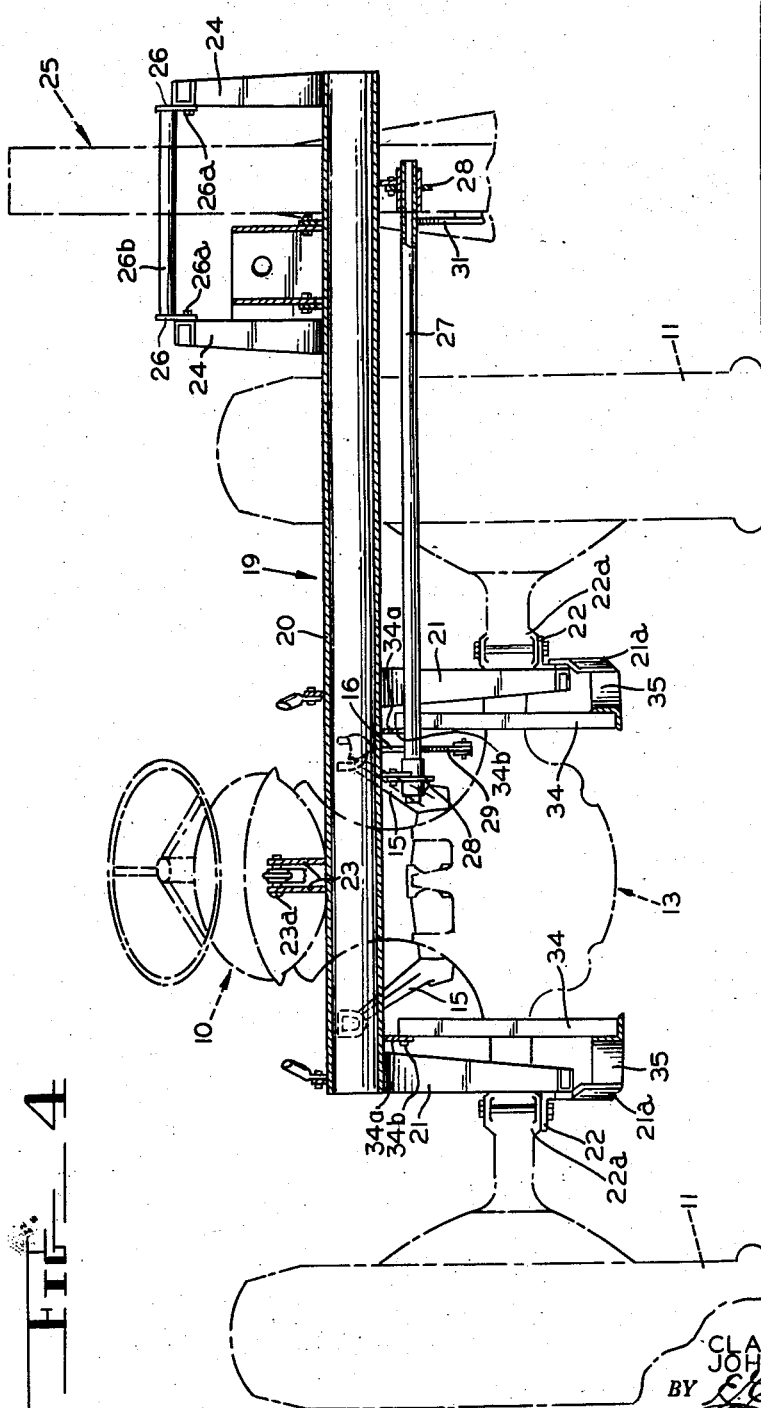
INVENTORS
CLARENCE B. RICHEY
JOHN F. O'DONNELL
BY
ATTORNEYS

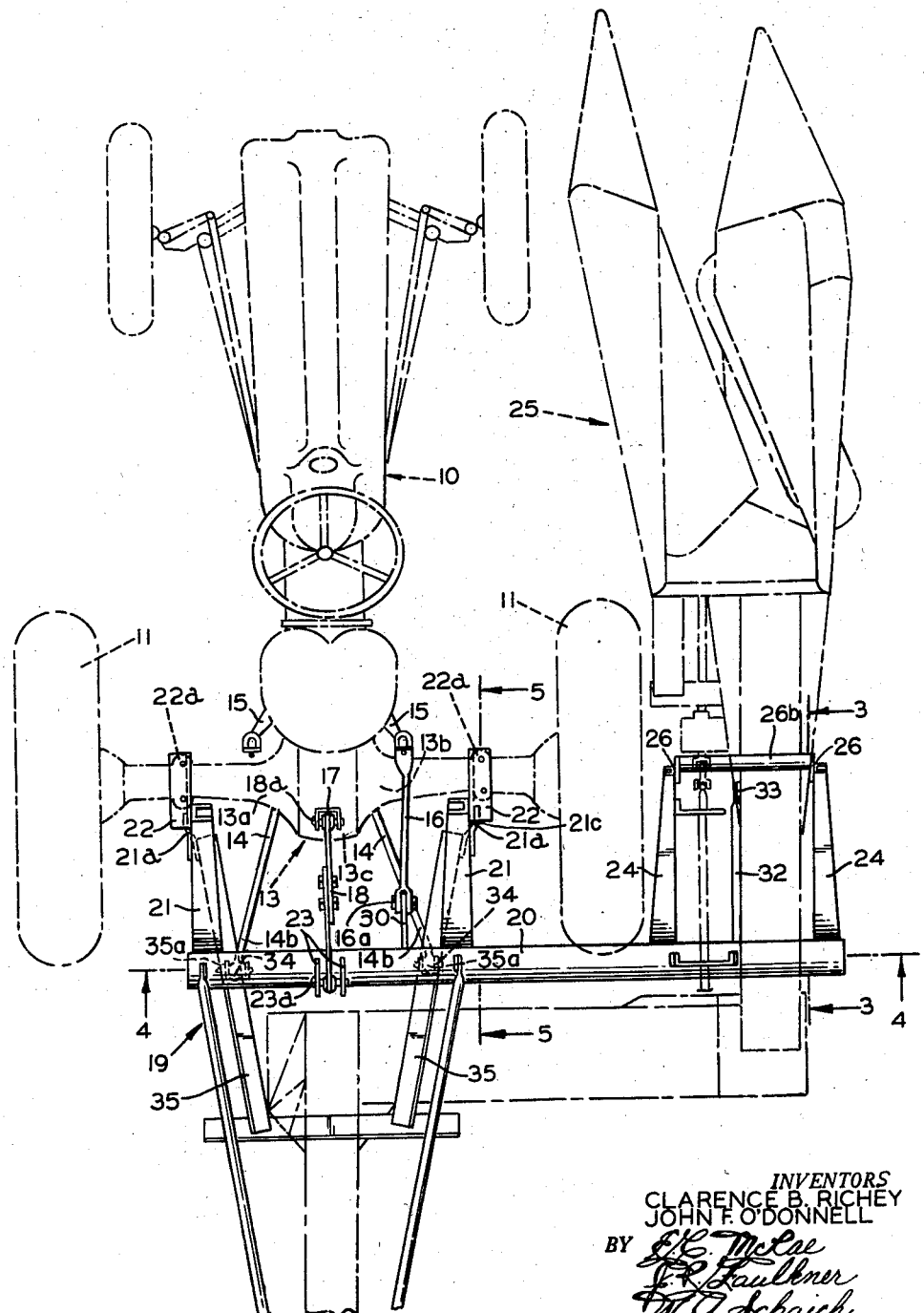

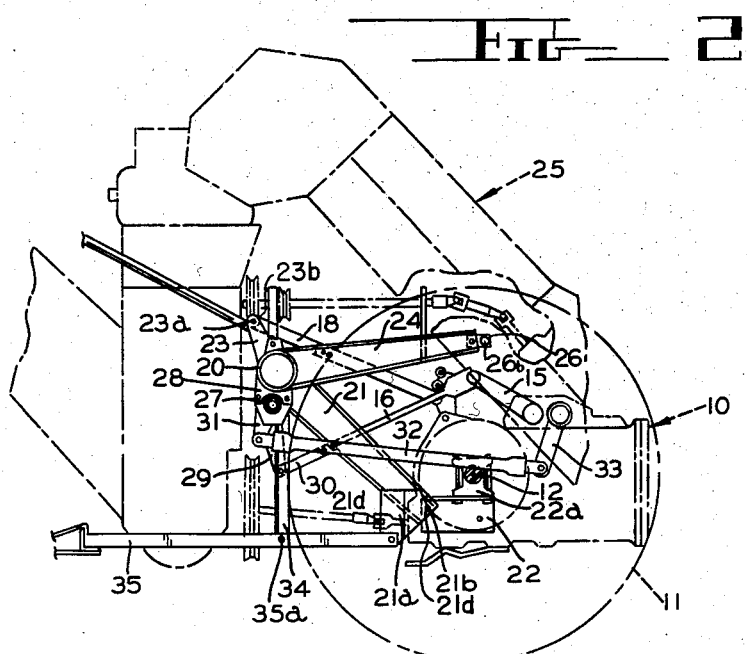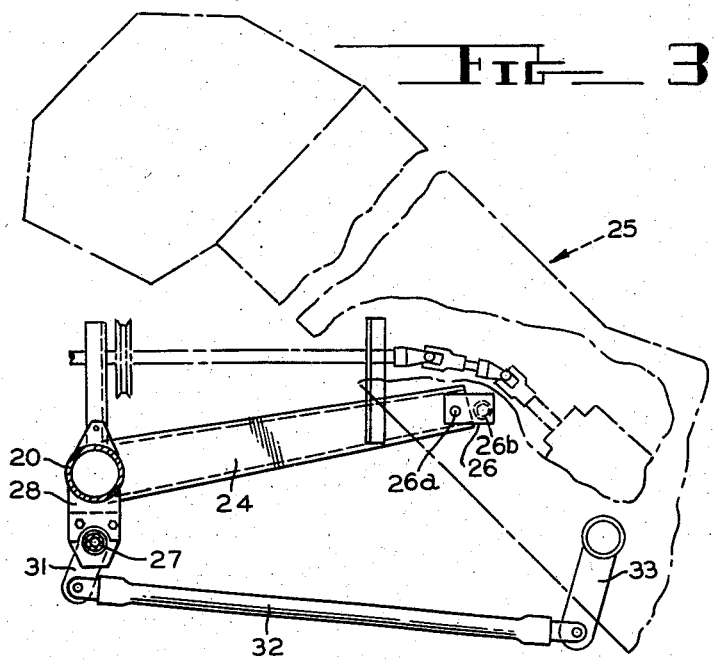

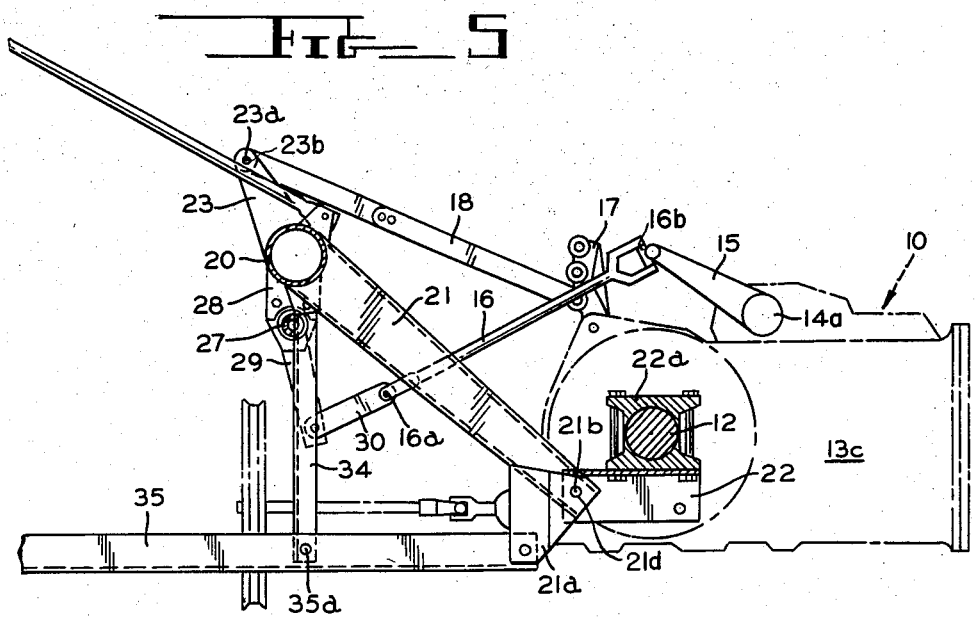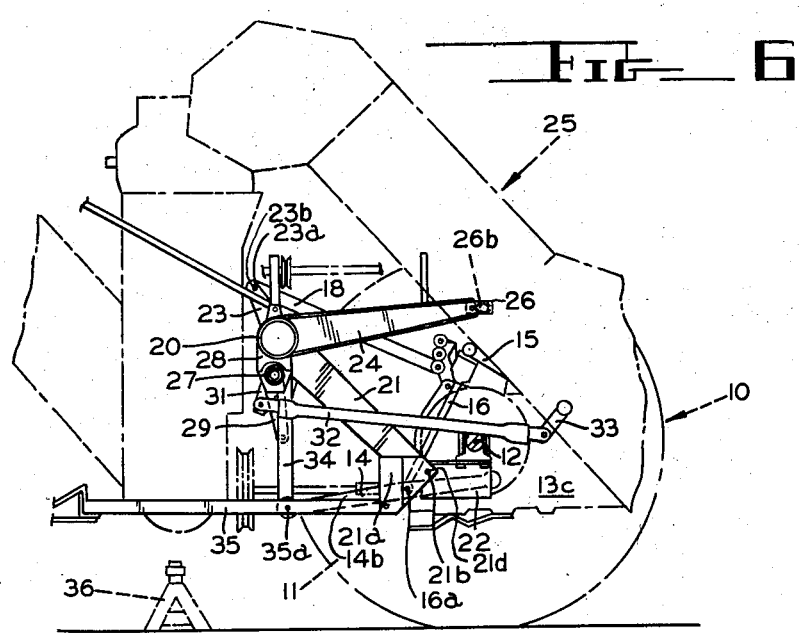

United States Patent Office 2,849,850
Patented Sept. 2, 1958

2,849,850

TRACTOR MOUNTED HARVESTER

John F. O'Donnell, Utica, and Clarence B. Richey, Royal Oak, Mich., assignors to Ford Motor Company, Dearborn, Mich., a corporation of Delaware Application December 28, 1953, Serial No. 400,482

5 Claims. (Cl. 56—15)

This invention relates to a frame and mounting for a harvester implement for use with a tractor having a powered lift arm, whereby the gathering head of the implement may be conveniently raised and lowered by said lift arm for most effective crop gathering operations.

Implements such as corn pickers, combines and the like utilize crop gathering heads which require vertical adjustment to varying crop heights and conditions so that the crop can be cleanly and completely harvested.

Also, tractor mounted harvesting implements of the type referred to are heavy, and accordingly, they are difficult to attach to a tractor for use. It has normally been required that such implements be elevated for mounting on the tractor by means of hoists, jacks or other suitable device. Therefore, preparation of a machine and tractor for the harvesting operation has heretofore been a difficult and time consuming job.

Accordingly, it is an object of this invention to provide an improved frame for a harvesting implement which can be conveniently mounted on a tractor.

Another object of the present invention is to provide an improved harvesting implement for use with a tractor having a power operated lift arm, which utilizes the lift arm for vertically moving the gathering head of said implement.

A further object of this invention is to provide an improved frame for a corn picker which is conveniently mountable upon a tractor having a pair of power operated lift arms, characterized by the employment of said lift arms to lift the implement into attaching position and subsequently using one of said arms to vertically adjust the operating height of the gathering head of said implement.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of the improved implement frame constructed in accordance with the present invention, showing the implement mounted on the rear axle and top link of a tractor having a power operated lift arm.

Figure 2 is a fragmentary side view of the right hand side of the implement frame of the present invention showing the pivotal mounting of the harvesting head on the frame, and showing the mechanism for tilting said harvesting head.

Figure 3 is an enlarged section view taken along the plane 3—3 of Figure 1.

Figure 4 is an enlarged section view taken along the plane 4—4 of Figure 1.

Figure 5 is an enlarged section view taken along the plane 5—5 of Figure 1.

Figure 6 is a fragmentary side view of the right hand side of the implement frame showing the implement in a position lifted by the tractor's power lifted draft links, for attachment to the tractor's rear axle and top link.

As shown on the drawings:

Numeral 10 refers generally to a tractor of well-known make having a pair of rear wheels 11 mounted upon the ends of a rear axle 12. Axle 12 is rotatably supported within a rear axle and differential housing 13. As shown in Figure 6 a pair of longitudinally extending trailing draft links 14 are respectively pivotally secured at their forward ends by pivot means (not shown) to laterally spaced points on rear axle housing 13a and 13b, adjacent the differential housing 13c. The upper portion of differential housing 13c is provided with a rotatable rock shaft 14a which has a pair of rock arms 15 secured to its exposed ends. A pair of links 16 are respectively pivotally connected between the ends of the arms 15 and medial points on draft links 14. One of said links 16 is subsequently removed as will be explained later. The connecting links 16 are attached to the draft links 14 by means of disconnectable bolts 16a and advantage is taken of such disconnect means in the structure of the present invention, in a manner to be later described. A hydraulic cylinder and piston assembly (not shown) is built into the differential housing 13c for rotating the rock shaft 14a. An arcuate lifting movement is thereby imparted to the lift arms 15 for lifting the draft links 14.

As best shown in Figure 5, a yoke 17 is pivotally mounted by pin means (not shown) on the upper rear portion of differential housing 13c and an adjustable length top link 18 has its forward end pivotally connected with said yoke by means of a pin 18a. The rear ends 14b of draft links 14 and top link 18 are provided with self-aligning ball connections for attaching implements thereto and provide the well known three-point implement suspension system.

A harvester frame made in accordance with the present invention is illustrated generally by reference numeral 19 and includes a transversely extending tubular main frame member 20. Frame 20 projects laterally beyond the right hand side of the tractor and a forwardly projecting crop engaging gathering head 25 is mounted on the outer end of said frame member in a manner to be later described. Frame member 20 is provided with a pair of laterally spaced, forwardly extending arms 21, whereby it is adapted to be attached to the tractor rear axle and differential housing 13. As best shown in Figure 5, arms 21 are of U-shaped cross section, and are fitted at their forward ends with triangular plates 21a, welded thereto. The forward edges of the plates 21a are spaced laterally from the front ends of arms 21 to cooperate with said arms 21 to provide attaching yokes 21c. A pair of apertured angle iron brackets 22 are respectively bolted to laterally spaced mounting pads 22a formed on the tractor rear axle housings 13a and 13b. Plates 21a and arms 21 are provided with aligned transverse apertures 21d whereby the frame arms 21 can be attached to said apertured brackets 22, using pivot pins or bolts 21b, as desired.

Frame member 20 is also provided with a pair of laterally spaced, upstanding lugs 23, positioned centrally of the aforementioned arms 21. Lugs 23 have transverse apertures 23b for the receipt of a pin 23a, whereby frame member 20 is connected with the rear end of the tractor top link 18. With such frame construction it is apparent that the harvesting implement 19 is vertically and laterally fixed in a generally triangulated relation to the tractor 10, to which it is mounted.

As shown in Figures 1 and 3, frame member 20 is provided with a second pair of lateraly spaced arms 24 which extend forwardly and slightly upwardly for pivotally supporting a harvester head 25. The forward ends of arms 24 are provided with apertures and the harvesting head 25 is fitted with a pair of apertured brackets 26 fixedly secured to one another by a shaft 26b, which brackets are respectively adapted to be pivotally fastened to said frame arms 24 by means of bolts or attaching pins 26a. Thus harvesting head 25 is adapted to pivot on the forward ends of frame arms 24 and by being pivoted, the front end of the harvesting head is caused to be moved in a vertical plane, and thus can be raised or lowered as desired.

A transversely extending shaft 27 is journaled parallel and in depending relation to the main frame member 20 by means of a pair of laterally spaced, depending bearing brackets 28, Figure 4. As shown in Figure 5, a crank arm 29 is welded near the left hand end of shaft 27 and is provided at its free end with an aperture for pivotal connection, by means of a pin or bolt with a link 30. The free end of link 30 and the lower end of the right hand connecting link 16 of tractor 10 are connected together by means of the aforementioned bolt 16a. The connecting link 16 is normally pivotally connected to a medial point of the right hand tractor draft link 14.

As shown in Figure 3, the right hand end of shaft 27 is also provided with a second crank arm 31. The harvesting unit 25 is provided with an attachment link 33, rigidly affixed thereto. A connecting link 32 is respectively pivotally connected at its ends with the crank arm 31 and the gathering head attachment link 33. Thus when the tractor hydraulic mechanism (not shown) is activated to lift or lower the rock arm 15, Figure 5, the shaft 27 will be rotated. This rotary movement is transmitted to the right hand crank arm 31 of shaft 27, and thence to the crop gathering head 25 by the link 32. Gathering head 25 will thus be pivoted upon the mounting bolts 26a, by which it is attached to the support arms 24 of frame 19, and the front end of the gathering head 25 will be raised or lowered.

This invention further contemplates using the power-lifted tractor draft links 14 as a power lift assist in attaching the present harvester frame to the tractor. Accordingly, as shown in Figure 6, the harvester frame 20 is provided with a pair of depending lugs 34a fixedly secured to said frame 20. A pair of depending angle iron supports 34 and are respectively connected at their upper ends to said lugs 34a by bolt means 34b and are respectively connected at their lower ends to a pair of laterally spaced, longitudinally extending, horizontal frame members 35. Frame members 35 are respectively bolted at their forward ends to the previously described triangular plates 21a, attached to the forward ends of the support arms 21. The connection between each of the vertically disposed support arms 34 and the longitudinal extending frame members 35 are provided with laterally extending hitch pins 35a, to which the trailing near link ends 14b of the tractor draft links 14 are adapted to be connected. As shown in Figure 6, the harvesting implement 19 will preferably be stored by being supported upon one or more suitable stands 36. When thus stored, the tractor is backed to the harvester so that the draft link ends 14b are aligned with and can be connected to the hitch pins 35a. The implement is then lifted to align the forward ends of the implement frame support arms 21 with the tractor attaching brackets 22. The connecting pins 21b, Figure 5, are then inserted in the apertures 21d provided to complete the mounting of the implement to the tractor rear axle housing 13. It is a simple matter to connect the implement frame 20 to the rear end of the tractor top link 18 by manipulating tractor draft links 14 so that the rear end of top link 18 and the apertures of lugs 23 are aligned for placement of the connecting pin 23a, thus completing the mounting of the harvester to the tractor.

After this mounting is effected, the left lift arm connecting link 16 is completely removed from the tractor by removing the quick disconnecting bolt 16a and by disassembling the universal joint 16b at its upper end. The right hand connecting link 16, however, is only disconnected at its lower end from its respective draft link 14 and is reconnected to the link 30 which is attached to the free end of the harvester operating crank arm 29 of harvester 19. Then, as previously described the operating height of the gathering head can be controlled by manipulation of the lift arm 15 and connecting link 16, by rocking the control shaft 27.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a tractor having a rear axle, a pair of transversely spaced, power-liftable trailing draft links and a central top link: an implement mounting comprising a transverse frame member, said frame member having an end portion projecting laterally beyond the tractor, means for supporting a crop gathering implement on said projecting frame end, a pair of longitudinal arm members extending forwardly from the transverse frame member and having their rearward ends secured at laterally spaced points on said transverse frame member, the forward ends of said arms being pivotally attachable to laterally spaced points on said tractor, said frame member being pivotally attachable to said top link, and means on said frame member for pivotally receiving the rear ends of said draft links, said frame member being litfable by said draft links to an elevated position at which the forward ends of said arms are attachable to the tractor, and the connection of said arms to the tractor and of said top link to said frame member supporting said frame member from said tractor in a substantially triangulated stable relation therewith.

2. The combination defined in claim 1 wherein said points of attachment comprise a pair of verticaly disposed brackets respectively secured to and transversely of said tractor rear axle, a pair of plates respectively secured at one end to the forward end of said arm and cooperatively laterally spaced at its unsecured end from said arm member and forming a yoke thereof, respectively aligned apertures in said arm and plate members and said vertically disposed brackets, and releasable pivotal connection means transversing said apertures and pivotally attaching said arms to said tractor rear axle.

3. For use with a tractor having a rear axle, a pair of transversely spaced, power-liftable trailing draft links and a central top link, a mounted harvester frame, comprising a transverse frame member having an end portion projecting laterally beyond the tractor and adapted to support a crop gathering portion of a harvester, rigid frame elements extending downwardly and forwardly from the transverse frame member at two spaced locations therealong, the lower, forward extremities of said frame elements being constructed and arranged for attachment to the rear axle of the tractor, means mounted on the transverse frame member midway between the frame elements for pivotally receiving the rear end of the top link, and means mounted on portions of the frame elements generally vertically below the transverse frame member for pivotally receiving the rear ends of the draft links.

4. For use with a tractor having a rear axle, a pair of transversely spaced trailing draft links, a pair of power operated rock arms, lift links connecting the rock arms with the draft links for lifting the draft links, and a central top link: a mounted harvester having a frame comprising a transverse frame member, an end portion of which projects laterally beyond the tractor, a crop gathering portion pivotally supported from the projecting end of the frame for vertical swinging movement, rigid frame elements extending downwardly and forwardly from the transverse frame member at two spaced locations therealong, the forward extremities of said frame elements being constructed and arranged for attachment to the rear axle of the tractor, means mounted on the transverse frame member midway between the frame elements for pivotally receiving the rear end of the tractor top link, means mounted on portions of the frame elements generally vertically below the transverse frame member for pivotally receiving the rear ends of the draft links, and means, including a crank journaled on the frame member, for rotating the crop gathering portion on its pivotal mounting for height adjustment, said crank being connectable with one of the rock arms for actuation thereby.

5. For use with a tractor having a rear axle, a pair of rearwardly extending draft links pivotally supported from the axle, a power lift mechanism, and a pair of lift links extending from the lift mechanism and adapted to be pivotally connected with the draft links: an elongated, transversely extending crop harvester frame having a pair of spaced, forwardly extending rigid frame portions adapted to be secured to the tractor rear axle, a top link pivotally supported from said frame member between the rigid frame portions and having a forward end adapted to be pivotally connected to the top portion of the tractor rear axle, a bearing bracket on said frame having a lift mechanism rotatably mounted therein, including a radially projecting lever provided with means for pivotal connection with one of the tractor lift links, and means on the spaced rigid frame portions for pivotally receiving the rear ends of the tractor draft links whereby during assembly of said harvester frame with a tractor the draft links may be connected with the frame and the lift links may be connected with the draft links for lifting the frame to mounted position.

References Cited in the file of this patent
UNITED STATES PATENTS

| | | |
|---|---|---|
| 2,532,164 | Hansen et al. | Nov. 28, 1950 |
| 2,536,899 | Andrews et al. | Jan. 2, 1951 |
| 2,626,549 | Silver et al. | Jan. 27, 1953 |
| 2,638,728 | Balzer et al. | May 19, 1953 |
| 2,736,152 | Andrews et al. | Feb. 28, 1956 |